United States Patent
Burgess et al.

(10) Patent No.: US 8,943,118 B2
(45) Date of Patent: Jan. 27, 2015

(54) DATA PROCESSING APPARATUS AND METHOD FOR REDUCING THE SIZE OF A LOOKUP TABLE

(75) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 259 days.

(21) Appl. No.: 13/562,497

(22) Filed: Jul. 31, 2012

(65) Prior Publication Data

US 2014/0040334 A1   Feb. 6, 2014

(51) Int. Cl.
*G06F 15/00*   (2006.01)

(52) U.S. Cl.
USPC ........................................................ 708/492

(58) Field of Classification Search
CPC ... G06F 7/7257; G06F 7/7271; G06F 7/7264; H03M 13/15; H03M 13/151
USPC ........................................................ 708/492
See application file for complete search history.

(56) References Cited

U.S. PATENT DOCUMENTS

| | | |
|---|---|---|
| 5,440,269 A | 8/1995 | Hwang |
| 5,491,634 A | 2/1996 | Miller et al. |
| 5,604,499 A | 2/1997 | Miyagoshi et al. |
| 6,260,054 B1 | 7/2001 | Rosman et al. |
| 6,604,121 B1 | 8/2003 | Ell et al. |
| 2002/0075953 A1 | 6/2002 | Lim et al. |
| 2006/0080376 A1 | 4/2006 | Zhang et al. |
| 2010/0322412 A1 | 12/2010 | Hung et al. |

FOREIGN PATENT DOCUMENTS

JP   7-111461   4/1995

OTHER PUBLICATIONS

UK Search Report dated Nov. 29, 2013 in GB 1310942.6.

*Primary Examiner* — Tan V. Mai
(74) *Attorney, Agent, or Firm* — Nixon & Vanderhye P.C.

(57) ABSTRACT

A lookup table receives an n-bit input value and returns an output value that would be obtained by performance of a predetermined operation on the input value. The number of entries in the lookup table is less than $2^n$. An n-bit input data value is received, a modification condition is detected if any of a predetermined number of significant bits of the input data value are logic zeroes, and a shift operation is performed on the input data value if the modification condition is detected, prior to providing the input to the lookup table. If the modification condition is detected, an output value derivation operation is performed on the output value received from the lookup table to modify it prior to returning it to for processing. The derivation operation accounts for the shift operation. This approach can lead to a significant reduction in the lookup table size.

15 Claims, 6 Drawing Sheets

| X | X' | Y' | Y" | Y |
|---|---|---|---|---|
| 1111 0100 | 1111 0100 | 0110 1000 | 0110 1000 | 0110 1000 | no left shift → no left shift → no reduction

| X | X' | Y' | Y" | Y |
|---|---|---|---|---|
| 0111 1010 | 1111 0100 | 0110 1000 | 1101 0000 | 1101 0000 |

MSBs = 01, LEFT SHIFT BY 1 → LEFT SHIFT BY 1 → No reduction

| X | X' | Y' | Y" | Y |
|---|---|---|---|---|
| 0111 0001 | 1110 0010 | 1101 0110 | 1010 1100 | 1011 0111 |

MSBs = 01, LEFT SHIFT BY 1 → LEFT SHIFT BY 1 → REDUCTION

```
  1010 1100
+c  0001 1011   (XOR)
---------------
→ 1011 0111
```

DATA PROCESSING APPARATUS AND METHOD FOR REDUCING THE SIZE OF A LOOKUP TABLE

BACKGROUND OF THE INVENTION

1. Field of the Invention

The present invention relates to a data processing apparatus and method for reducing the size of a lookup table.

2. Description of the Prior Art

Within data processing systems, it is known to employ lookup tables to avoid the need for particular operations to be performed. Instead of the processing circuitry needing to perform a chosen operation, the results of that operation for all possible variants of input are encoded into the lookup table, such that for a particular input data value, that input data value can be provided as an input to the lookup table, with the corresponding output data value representing the result of applying that chosen operation to the input data value then being returned as an output from the lookup table.

The lookup table can be constructed in a variety of ways. Whilst it logically provides a plurality of entries, each entry identifying one possible input data value and the corresponding output data value, the lookup table need not be constructed as a block of memory cells, but instead may be reconstructed using combinations of logic gates used to generate the required output data value for each possible input data value.

However the lookup table is constructed, it can significantly contribute to the overall area and power consumption of the processing circuitry. By way of example, the use of such lookup tables is common within execution units used to implement AES encryption and decryption processes, where the lookup table may be used to provide as output data values the multiplicative inverse of input data values. In particular, such multiplicative inverse values are required as part of the S-box function defined in the AES cryptography Standard.

In that particular example, a 128-bit input value can be split into 16 8-bit sections, and a separate lookup table can then be provided for each 8-bit section. Hence, this results in 16 separate lookup tables, each requiring 256 entries to encode the multiplicative inverse output data values for each of the possible 256 values of the corresponding 8-bit input. It has been found that these lookup tables can occupy the majority of the area of the execution unit used to implement the AES encryption and decryption processes, and that the operation of those lookup tables can contribute very significantly to the overall power consumption.

One known approach for seeking to reduce the size of the lookup tables in the above AES example is to replace the 8-bit Galois field (GF) datapath (a Galois field also being known as a finite field) by two 4-bit GF datapaths or four 2-bit GF datapaths. However, whilst such an approach can save some area in the resultant lookup tables required, the mapping transformations needed to convert the 8-bit GF to and from a 4-bit GF and the 4-bit GF to and from a 2-bit GF are complicated, and may add as much delay to the critical path as they save in a reduced wordlength datapath.

Accordingly, it would be desirable to provide an improved technique for reducing the size of a lookup table implementation, so as to enable a reduction in area and power consumption.

SUMMARY OF THE INVENTION

Viewed from a first aspect, the present invention provides a data processing apparatus, comprising: processing circuitry configured to perform operations on data; and lookup table circuitry configured to receive from the processing circuitry an n-bit input data value, and to return to the processing circuitry an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the lookup table circuitry comprising: a lookup table providing a plurality of entries, each entry identifying a possible input data value and a corresponding output data value, said plurality of entries being less than $2^n$; input interface circuitry configured to receive the n-bit input data value and to generate an intermediate input data value for provision to the lookup table, the input interface circuitry being configured to detect a modification condition if any of a predetermined number of significant bits of the input data value are logic zero values, the input interface circuitry being configured, if said modification condition is not detected, to retain the input data value as the intermediate input data value, and being configured, if said modification condition is detected, to perform a shift operation on the input data value in order to generate said intermediate input data value; output interface circuitry configured to receive from the lookup table an intermediate output data value corresponding to the intermediate input data value generated by the input interface circuitry, and to generate, from the intermediate output data value, the output data value to be returned to the processing circuitry; the output interface circuitry being configured, if said modification condition is not detected by the input interface circuitry, to retain the intermediate output data value as said output data value, and being configured, if said modification condition is detected by the input interface circuitry, to perform an output data value derivation operation on the intermediate output data value in order to generate said output data value, the output data value derivation operation at least taking account of the shift operation performed by the input interface circuitry.

In accordance with the present invention, the lookup table is not provided with an entry for each possible input data value, and accordingly for an n-bit input data value there will be less than $2^n$ entries provided. Such an approach can be taken wherever the lookup table circuitry is used to encode the output data values for an operation that satisfies certain mathematical properties. In particular, in accordance with a first property the output data value should be a function of the input data value, and in accordance with a second property a first output data value produced for a first input data value should be derivable from a second output data value produced for a second input data value.

The lookup table circuitry of the present invention includes, in addition to a lookup table providing a plurality of entries less than $2^n$, input interface circuitry and output interface circuitry. The input interface circuitry detects if any of a predetermined number of significant bits of the input data value are logic zero values, and under that condition performs a shift operation in order to generate a modified version of the input data value for input to the lookup take. Similarly, the output interface circuitry is arranged, in situations where such a shift operation has been performed by the input interface circuitry, to modify the output data value received from the lookup table prior to passing that output data value back to the processing circuitry. In particular, under such a situation, the output interface circuitry performs an output data value derivation operation on the value received from the lookup table, where that derivation operation at least takes account of the shift operation performed by the input interface circuitry. As a result of the technique of the present invention, a significant reduction in the size of the lookup table can be achieved. Further, both the input interface circuitry and the output interface circuitry can be readily implemented with relatively few components, such that the size and power consumption resulting from the addition of the input interface circuitry and the output interface circuitry is far outweighed by the savings in area and power consumption achievable from the reduction in the lookup table size.

The predetermined operation can take a variety of forms, provided it meets the two properties discussed earlier. However, in one embodiment the predetermined operation is a multiplicative inverse operation. Such multiplicative inverse operations are used in a variety of situations, and the technique of the present invention can be used in any such situation. One particular example implementation where the multiplicative inverse operation is used frequently is when implementing the S-box function of the AES cryptography Standard. The S-box function comprises a two-stage process, the first stage involving taking the multiplicative inverse over a Galois field of a data input, and the second stage then subjecting the multiplicative inverse to an affine transformation, itself comprising a matrix x vector multiplication-and-addition sequence. The AES Standard additionally specifies an inverse S-box function which also comprises a two-stage process, the first stage performing the inverse of the S-box affine transformation on the data input, and the second stage then taking the multiplicative inverse over a Galois field of the output of the inverse affine transformation. Often, in both the S-box function and the inverse S-box function, the multiplicative inverse operation is implemented as a lookup table. In such scenarios, the use of the technique of the present invention can result in significant area reductions in the circuitry required to perform both the S-box and inverse S-box functions.

The significant bits of the input data value that are analysed by the input interface circuitry to detect the presence or absence of the modification condition can take a variety of forms. For example, those significant bits may be a certain number of least significant bits in one implementation, whilst in an alternative implementation those significant bits may be a number of most significant bits. In one particular implementation, the input interface circuitry is configured to detect said modification condition if any of a predetermined number of most significant bits of the input data value are logic zero values, and the shift operation is a left shift operation.

The output data value derivation operation can take a variety of forms. However, in one embodiment the output data value derivation operation comprises shifting the intermediate output data value by the same number of bits as the associated input data value was shifted by said shift operation in order to produce a modified intermediate output data value, and then performing an adjustment operation on the modified intermediate output data value if a logic 1 value was present in a predetermined number of significant bits of the intermediate output data value.

Hence, by way of example, if in the presence of the modification condition the input data value is left shifted by two bits in order to produce the intermediate input data value provided to the lookup table, the intermediate output data value received from the lookup table will be left shifted by two bits in order to produce the modified intermediate output data value. Similarly, a one-bit left shift applied to the input data value prior to the table lookup will also result in the intermediate output data value from the lookup table being left-shifted by one bit.

The adjustment operation is then selectively performed, dependent on whether a logic one value is present in a predetermined number of significant bits of the intermediate output data value. In one embodiment, the predetermined number of significant bits considered at this point is the same as the predetermined number of significant bits evaluated by the input interface circuitry when detecting the presence or absence of the modification condition.

The adjustment operation can take a variety of forms, but in one embodiment comprises adding at least one predetermined constant to the modified intermediate output data value.

The manner in which the addition is performed will depend on the type of arithmetic operation encoded in the lookup table. In one embodiment, the predetermined operation is a finite field arithmetic operation, and said at least one predetermined constant is added to said modified output data value by performing an exclusive OR operation.

The values of the constant will also depend on the type of operation, and how that operation is being used by the processing circuitry. Considering the earlier examples where the shift operations performed are left shift operations, these shift operations implement a multiplication. Considering the earlier example implementation of AES cryptography, when the techniques of embodiments of the present invention are used in that situation, the values of the at least one predetermined constant will depend on the way in which multiplication is defined in the AES cryptography Standard.

In one embodiment, the input interface circuitry is configured to detect said modification condition if any of said predetermined number of most significant bits of the input data value are logic zero values, and the immediately following most significant bit is a logic one value. Hence, if the predetermined number of most significant bits considered by the input interface circuitry is the two most significant bits, the modification condition will be detected if the most significant three bits are "001". However, in one embodiment, the predetermined number of most significant bits considered by the input interface circuitry is the one most significant bit, and accordingly the input interface circuitry is configured to detect the modification condition if the most significant two bits of the input data value are "01". In this particular example, 25% of the possible input data values will have the most significant two bits equal to "01". In accordance with the technique of the described embodiments, the lookup table does not need to maintain entries for those 25% of possible values, and accordingly the lookup table provides $\frac{3}{4} \times 2^n$ entries.

In embodiments where the modification condition is detected if the most significant two bits of the input data value are "01", then the shift operation performed by the input interface circuitry on detection of the modification condition is a one-bit left shift operation.

Similarly, the output data value derivation operation comprises performing a one-bit left shift on the intermediate output data value in order to produce a modified intermediate output data value, and then adding a predetermined constant to the modified intermediate output data value if the most significant bit of the intermediate output data value was a logic 1 value.

In such an embodiment, it will be appreciated that both the input interface circuitry and the output interface circuitry are particularly simple to implement in a small area, and hence the overall reduction in size and power consumption of the lookup table circuitry is very significant.

Whilst the operations performed by the processing circuitry can take a variety of forms, in one embodiment the operations are either an AES encryption process on data or an AES decryption process on data.

Viewed from a second aspect, the present invention provides a method of configuring lookup table circuitry to receive from processing circuitry an n-bit input data value, and to return to the processing circuitry an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the method comprising: providing a lookup table having a plurality of entries, each entry identifying a possible input data value and a corresponding output data value, said plurality of entries being less than $2^n$; generating, from the n-bit input data value, an intermediate input data value for provision to the lookup table, by: (i) detecting a modification condition if any of a predetermined number of significant bits of the input data value are logic zero values; (ii) if said modification condition is not detected, retaining the input data value as the intermediate input data value; and (iii) if said modification condition is detected, performing a shift operation on the input data value in order to generate said intermediate input data value; receiving from the lookup table an intermediate output data value corresponding to the generated intermediate input data value; generating, from the intermediate output data value, the output data value to be returned to the processing circuitry by: (a) if said modification condition is not detected in said step (i), retaining the intermediate output data value as said output data value; (b) if said modification condition is detected in said step (i), performing an output data value derivation operation on the intermediate output data value in order to generate said output data value, the output data value derivation operation at least taking account of the shift operation performed in said step (iii).

Viewed from a third aspect, the present invention provides a data processing apparatus, comprising: processing means for performing operations on data; and lookup means for receiving from the processing means an n-bit input data value, and for returning to the processing means an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the lookup means comprising: lookup table means for providing a plurality of entry means, each entry means for identifying a possible input data value and a corresponding output data value, said plurality of entry means being less than $2^n$; input interface means for receiving the n-bit input data value and for generating an intermediate input data value for provision to the lookup table means, the input interface means for detecting a modification condition if any of a predetermined number of significant bits of the input data value are logic zero values, the input interface means, if said modification condition is not detected, for retaining the input data value as the intermediate input data value, and, if said modification condition is detected, for performing a shift operation on the input data value in order to generate said intermediate input data value; output interface means for receiving from the lookup table means an intermediate output data value corresponding to the intermediate input data value generated by the input interface means, and for generating, from the intermediate output data value, the output data value to be returned to the processing means; the output interface means, if said modification condition is not detected by the input interface means, for retaining the intermediate output data value as said output data value, and, if said modification condition is detected by the input interface means, for performing an output data value derivation operation on the intermediate output data value in order to generate said output data value, the output data value derivation operation at least taking account of the shift operation performed by the input interface means.

Viewed from a fourth aspect, the present invention provides lookup table circuitry for use by processing circuitry performing operations on data, the lookup table circuitry being configured to receive from the processing circuitry an n-bit input data value, and to return to the processing circuitry an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the lookup table circuitry comprising: a lookup table providing a plurality of entries, each entry identifying a possible input data value and a corresponding output data value, said plurality of entries being less than $2^n$; input interface circuitry configured to receive the n-bit input data value and to generate an intermediate input data value for provision to the lookup table, the input interface circuitry being configured to detect a modification condition if any of a predetermined number of significant bits of the input data value are logic zero values, the input interface circuitry being configured, if said modification condition is not detected, to retain the input data value as the intermediate input data value, and being configured, if said modification condition is detected, to perform a shift operation on the input data value in order to generate said intermediate input data value; output interface circuitry configured to receive from the lookup table an intermediate output data value corresponding to the intermediate input data value generated by the input interface circuitry, and to generate, from the intermediate output data value, the output data value to be returned to the processing circuitry; the output interface circuitry being configured, if said modification condition is not detected by the input interface circuitry, to retain the intermediate output data value as said output data value, and being configured, if said modification condition is detected by the input interface circuitry, to perform an output data value derivation operation on the intermediate output data value in order to generate said output data value, the output data value derivation operation at least taking account of the shift operation performed by the input interface circuitry.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
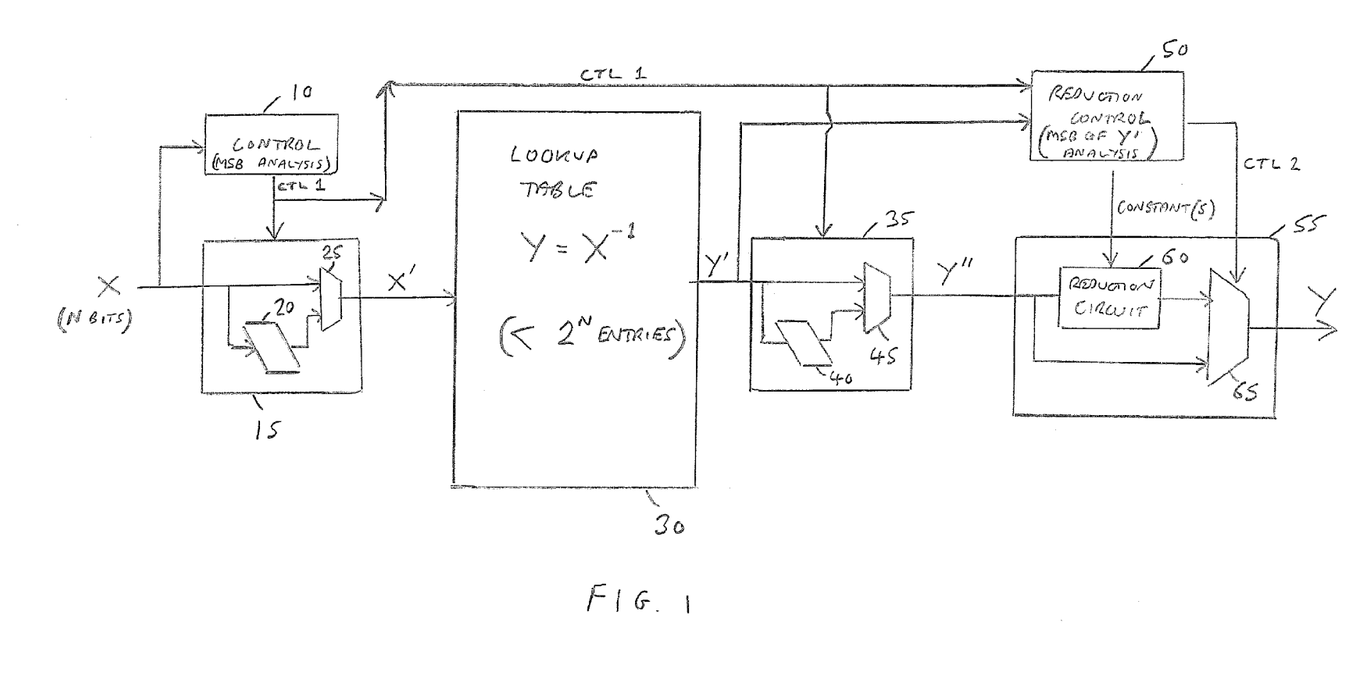
FIG. 1 is a block diagram of lookup table circuitry in accordance with one embodiment.

FIG. 1 is a block diagram of lookup table circuitry in accordance with one embodiment. Whilst the input data value X received by the lookup table circuitry is N bits in size, the lookup table 30 provides less than $2^N$ entries. To enable the lookup table circuitry to provide output data for every possible variation of input data value, certain input data values are modified by input interface circuitry formed by the components 10, 15, prior to a lookup within the table 30 being performed. Output interface circuitry consisting of the components 35, 50, 55 is then used to selectively modify the output from the lookup table prior to issuing the output data value Y.

The lookup table can map input values to output values for any predetermined operation that meets certain criteria. Firstly, the predetermined operation should have a first property that the output data value is a function of the input data value. In addition, it should have a second property that a first output data value produced for a first input data value is derivable from a second output data value produced for a second input data value. Various operations will meet these criteria. However, in the example illustrated in FIG. 1 it is assumed that the predetermined operation encoded by the lookup table is a multiplicative inverse operation. As such, the relationship between the input data value X and the output data value Y is that when X is multiplied by Y, the result is 1.

When a new input data value X is received, one or more significant bits of the input data value are routed to the control circuitry 10. Whilst in some embodiments, the significant bits routed to the control circuitry 10 could be least significant bits, in the embodiment illustrated in FIG. 1 it is assumed that they are one or more of the most significant bits of the input data value X.

The input data value X is also routed to the circuitry 15, which routes the input data value X unmodified to one input of a multiplexer 25, and then generates at the second input of the multiplexer 25 a version of the input data value that has been left shifted by a predetermined number of bits by the shifter circuitry 20. The amount of bits by which the input data value is left-shifted by the shifter circuitry 20 will depend on the analysis performed by the control block 10. In one example, the control block 10 may review the most significant two bits of the input data value X to see whether the most significant bit is a logic zero value, and if the most significant bit is a logic zero value it will then determine whether the second most significant bit is a logic one value. If the two most significant bits have the values "01", then the shift circuitry 20 will be arranged to perform a one bit left shift so that the most significant bit of the modified input data value output from the shifter will then be a logic one value. A logic zero value will then be inserted at the new least significant bit position.

In one embodiment, the above may be the only check that is performed by the control block 10. However, in an alternative embodiment the control block may be arranged, if the most significant two bits are not "01", to also check whether the three most significant bits of the input data value are "001". If that condition is detected, then the shift circuitry 20 is arranged to shift the input data value left by two bits. In one such embodiment, the shifter circuitry 20 may actually be constructed by two shift circuits, one that shifts the input data value left by one bit and another that shifts the input data value left by two bits, with the resultant outputs both being provided to the multiplexer 25. The multiplexer 25 can then be controlled by an output signal from the control block 10. In particular, in the above example, if the control block detects that the most significant two bits of the input data value X' are "01", then the one-bit left shifted version of the input data value will be output from the multiplexer 25 as an intermediate input data value X' for provision to the lookup table 30. Similarly, if instead the control block 10 detects that the three most significant bits of the input data value X are "001", then the control signal issued by the control block will cause the multiplexer 25 to select the two-bit left shifted version of the input data value X to provide as the intermediate input data value X' provided to the lookup table 30. If neither of these conditions are detected, then the control signal from the control block 10 will cause the unmodified data input value X to be output as the intermediate input data value X' to the lookup table 30.

The above discussion gives examples of two modification conditions that may be detected by the control block 10, but it will be appreciated that further modification conditions could be supported if desired, for example to detect the situation where the most significant four bits of X are "0001", requiring the shift circuitry 20 to support a 3-bit left shift.

Once X' has been generated as discussed above, the lookup table 30 will then output an intermediate output data value Y' corresponding to the multiplicative inverse of the received intermediate input data value X'.

The circuitry 35 then performs the same function as the circuitry 15, in this case selectively left-shifting the intermediate output data value Y' using the shift circuitry 40, with the multiplexer 45 then being driven by the same signal as used to drive the multiplexer 25. As a result, this will result in a further intermediate output data value Y" being issued from the circuitry 35. This further intermediate output data value Y" will be the same as the intermediate output data value Y' if the intermediate input data value X' was the same as the original input data value X. Similarly, if the intermediate input data value X' was generated by left-shifting the input data value X by one bit, then the further intermediate output data value Y" will be generated by left-shifting the intermediate output data value Y' by one bit, if the intermediate input data value X' was generated by left-shifting the input data value X by two bits, then the further intermediate output data value Y" will be generated by left-shifting the intermediate output data value Y' by two bits, etc.

The output interface circuitry also includes a reduction control block 50 and some associated circuitry 55 which may selectively perform an adjustment operation on the further intermediate output data value Y" if a particular condition is detected. In particular, the CTL 1 signal output from the control block 10 will identify whether any left-shifting was performed on the input data value X, and the number of bits of that left-shift if some left-shifting was applied. In situations where a left-shift has been applied, the reduction control block 50 then looks at a predetermined number of the most significant bits of the intermediate output data value Y' to see if any of those predetermined number of bits is set equal to one. The number of bits of the output data value Y' reviewed by the reduction control block 50 is dependent on the amount of left-shift applied. In particular, if a one bit left-shift was applied, then only the most significant bit of the intermediate output data value Y' is reviewed, whereas if a two-bit left-shift was applied, then the most significant two bits of the intermediate output data value Y' are reviewed.

If any of the predetermined number of bits of the intermediate output data value Y' are determined to be at a logic one value, then the left-shift performed by the circuitry 35 will have shifted that logic one value out of the N-bit value forming the further intermediate output data value Y". In this scenario, the circuitry 55 is used to perform an adjustment operation, which comprises adding at least one predetermined constant to the further intermediate output data value Y". In particular, the reduction circuit 60 will add the at least one predetermined constant provided by the reduction control block 50. In one embodiment, the predetermined operation encoded by the lookup table 30 is a finite field arithmetic operation, and accordingly the reduction circuit 60 adds the at least one predetermined constant to the further intermediate output data value Y" by performing an exclusive OR (XOR) operation. The resultant output is provided to a first input of the multiplexer 65, whilst an unmodified version of the further intermediate output data value Y" is provided to a second input of the multiplexer 65. The output of the multiplexer 65 is then controlled by a control signal from the reduction control block 50.

As a result, the output data value Y will always represent the multiplicative inverse of the input data value X for all possible variations of the input data value X, without the lookup table 30 requiring a separate entry for each of those possible values. If the control block 10 merely monitors for situations where the two most significant bits of the input data value are "01", and on occurrence of that condition modifies the input data value prior to provision to the lookup table, this will remove the requirement for the lookup table to encode 25% of the possible values. If in addition the control block 10 also looks for situations where the three most significant bits of the input data value are "001", and again modifies the input data values if that condition is true, then this will further reduce the number of entries required by an additional 12.5%. Accordingly, it can be seen that the reduction in size of the lookup table is very significant, and that the input interface circuitry and output interface circuitry required is relatively simple, thus giving rise to some very significant overall savings in area for the lookup table circuitry.

Figure 2:
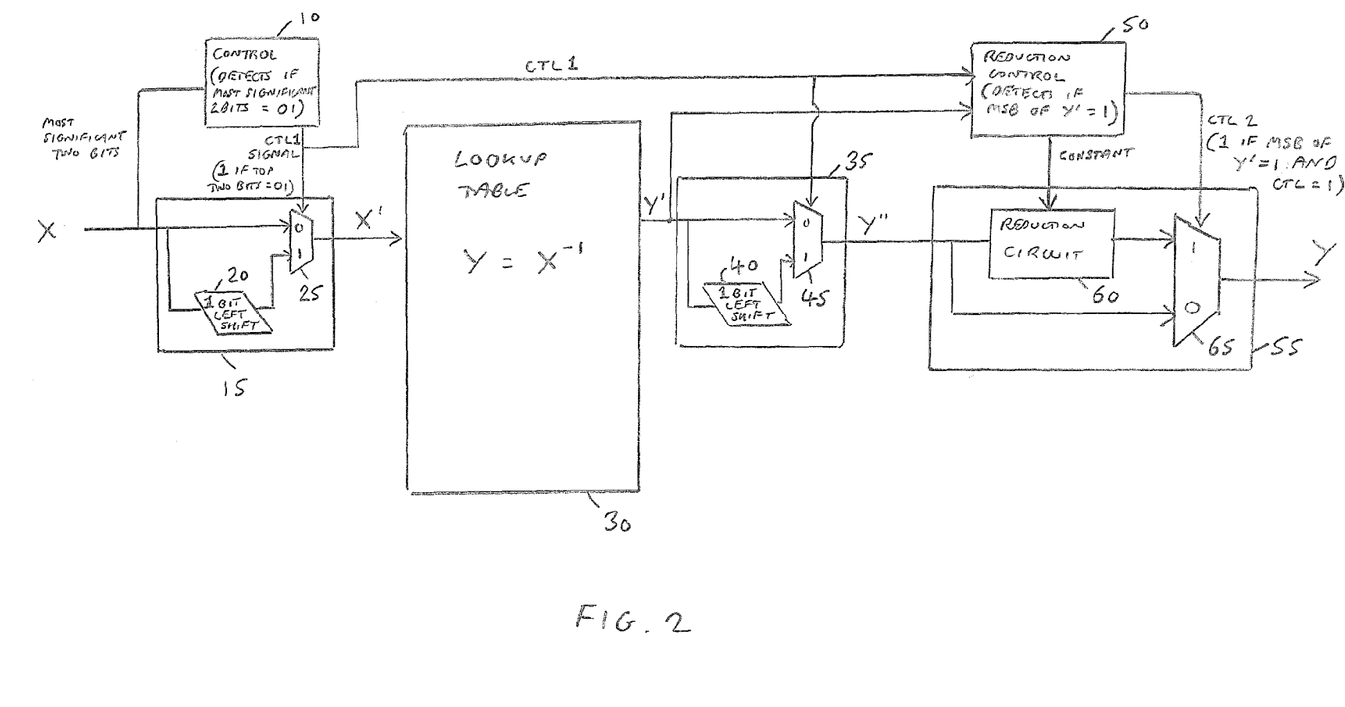
FIG. 2 is a block diagram of lookup table circuitry in accordance with one specific embodiment.

FIG. 2 is a specific example of the circuitry of FIG. 1, where the control block 10 only evaluates the two most significant bits of the input data value X to determine whether those two most significant bits have the value "01". In this situation, the shift circuits 20, 40 only need to perform a one bit left-shift operation. The CTL 1 signal output from the control block 10 is set to a logic one value if the top two bits do equal "01", and is set to a logic zero value otherwise. The reduction control block 50 then evaluates, in the presence of the CTL 1 signal being set equal to 1, whether the most significant bit of the intermediate output data value Y' is set equal to 1. Only a single constant needs to be output to the reduction circuit 60, and in the event that the CTL 1 signal is set to a logic one value, and the most significant bit of the intermediate output data value Y' is set equal to 1, then the CTL 2 signal output from the reduction control circuitry 50 is also set to a logic one value.

From the above description, it will be seen that if the most significant two bits of the input data value X are "01", the intermediate input data value X' is formed by left-shifting the input value X by one position to the left, which is equivalent to multiplying the input data value X by two. Under Galois field arithmetic (such as used in AES encryption), multiplying by two is equivalent to a one-bit left-shift. Applying 2X as the input to the lookup table returns as the intermediate output value Y' the value $(2X)^{-1}$, which equals $X^{-1}/2$ instead of $X^{-1}$ that is required as the output value Y. Therefore, when producing the output value Y, the intermediate output value Y' needs to be corrected by multiplying it by two, again using Galois field arithmetic. Under Galois field arithmetic, if the most significant bit of Y' was a logic one value, this would yield an out-of-range result, whose word length would have to be "reduced" by one bit using the rules of Galois field arithmetic. The AES cryptography Standard specifies the particular Galois field that is to be used, and accordingly the reduction circuit 60 will XOR the shifted value Y" with a predetermined 8-bit constant $C_1$.

Figure 3A:
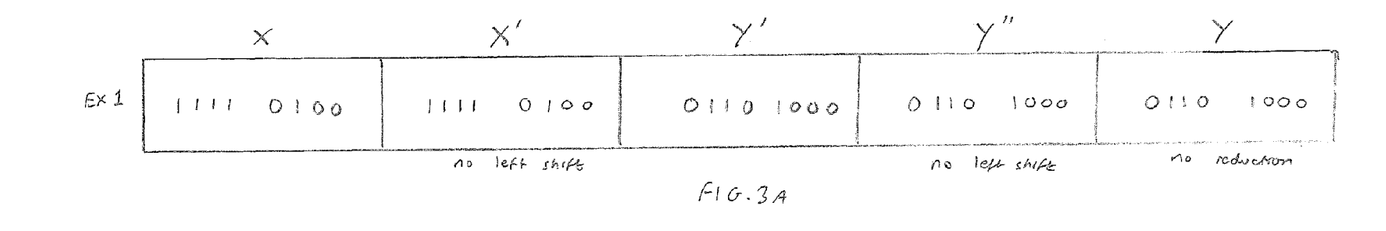
FIGS. 3A to 3C give examples of the data values at various points within the circuitry of FIG. 2 in accordance with one embodiment.
Figure 3B:
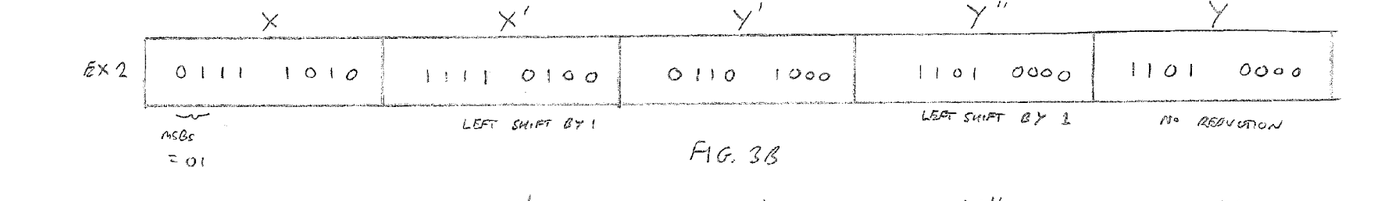
Figure 3C:
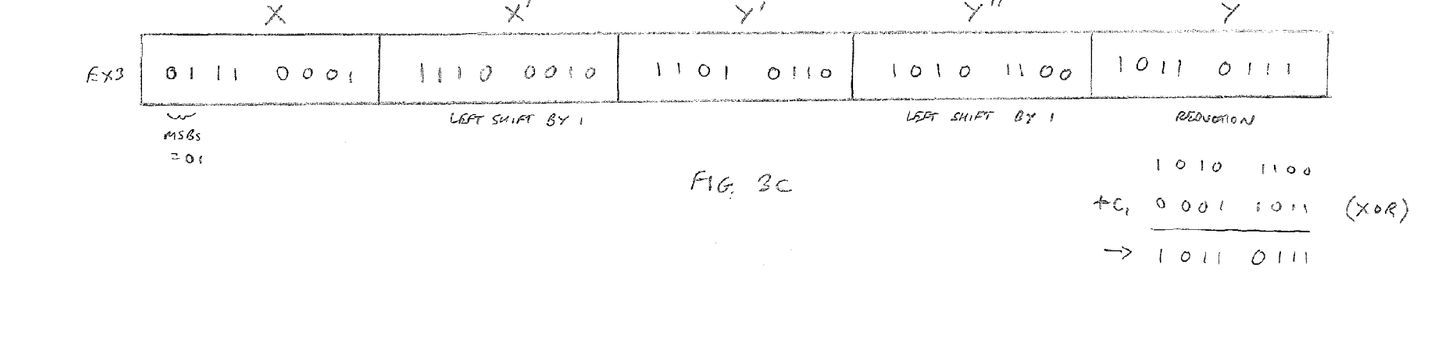

FIGS. 3A to 3C illustrate various examples of input data values X, and the corresponding values of the intermediate values X', Y' and Y" along with the final output value Y. Considering first FIG. 3A, the most significant two bits of the input data value X are not equal to "01", and accordingly no modification is performed by the input interface circuitry or the output interface circuitry. Accordingly X' is equal to X, and the value Y' is unmodified, such that Y" and Y both remain equal to Y'.

In the example of FIG. 3B, the most significant two bits of the input data value X are equal to "01", and accordingly the circuitry 15 performs a one bit left-shift to produce the illustrated intermediate input data value X'. When X' is provided as an input to the lookup table, the output value Y' shown in FIG. 3B is produced. The circuitry 35 then performs a one bit left-shift of the value Y' in order to produce the value of Y" shown in FIG. 3B. Since the most significant bit of Y' is not a logic one value, no reduction is required, and accordingly the output value Y is set equal to Y".

Finally, FIG. 3C shows an example where the most significant two bits of the input data value X are again "01", and accordingly a one bit left-shift of the input data value is performed to produce the value X'. Following provision of X' to the lookup table, the value Y' is output, and the circuitry 35 left-shifts that value by one to produce the value Y" shown in FIG. 3C. However, in this case, the most significant bit of Y' is equal to a logic one value, and accordingly that logic one value has been shifted out of the 8-bit value shown as Y" by virtue of the left shift. As a result, a reduction process is performed to produce the value of Y shown in the final entry of FIG. 3C. In this example, the constant $C_1$ added has the form "00011011". In this particular example, it is assumed that the multiplicative inverse function encoded by the lookup table is being used to implement part of the S-box function or inverse S-box function required by the AES cryptography Standard. As mentioned earlier, the one-bit left-shift operations performed by the circuits 15, 35 are in effect multiplying their input values by two. The manner in which multiplication is perform in accordance with the AES cryptography Standard then dictates the form of the constant that is required to be added by the reduction circuit 60. Due to the way addition is performed in accordance with the finite field arithmetic applicable to the AES cryptography, the addition required can be implemented by an XOR function.

Figure 4:
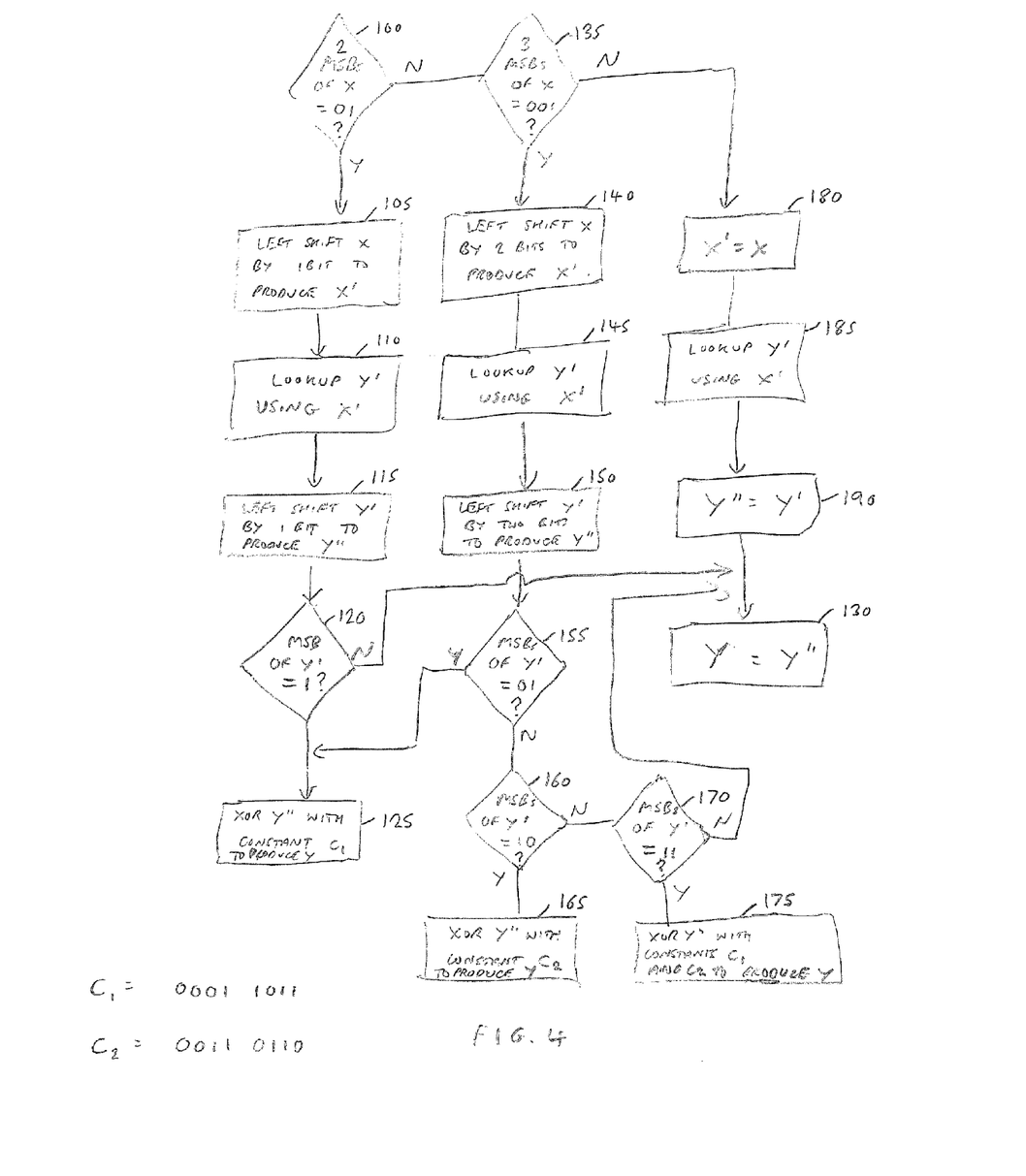
FIG. 4 is a flow diagram illustrating the operations performed by the circuitry of FIG. 1 in accordance with one embodiment.

FIG. 4 is a flow diagram illustrating the operation of the circuitry of FIG. 1 in accordance with one embodiment. At step 100, the control block 10 evaluates whether the two most significant bits of the input data value X are equal to "01". If so, the input data value X is left-shifted by one bit to produce the intermediate input data value X' at step 105. Thereafter, at step 110, the lookup table 30 is used to produce the intermediate output data value Y' using the intermediate input data value X'.

Thereafter, at step 115, the value Y' is left-shifted by one bit to produce the value Y". If it is then determined at step 120 that the most significant bit of Y' is equal to one, then the value Y'' is XORed with the constant $C_1$ in order to produce the output data value Y at step 125. However, if it is determined at step 120 that the most significant bit of Y' did not equal one, then the process branches to step 130, where the output data value Y is set equal to Y''.

If at step 100 it is determined that the two most significant bits of the input data value X are not equal to "01", then the process proceeds to step 135, where the control block 10 determines whether the three most significant bits of the input data value X are equal to "001". If so, then the process proceeds to step 140, where the input data value X is left-shifted by two bits to produce the intermediate input data value X'.

Next, at step 145, the lookup table 30 is used to produce the intermediate output data value Y' corresponding to the supplied intermediate input data value X'. Then, at step 150, Y' is left-shifted by two bits to produce the value Y''. The process then proceeds to step 155, where the reduction control block 50 determines whether the most significant two bits of Y' are equal to "01". If they are, then the process proceeds to step 125 where the value Y'' is XORed with the constant $C_1$ to produce the output data value Y.

If at step 155 it is determined that the most significant two bits of Y' are not equal to "01", it is then determined at step 160 whether the most significant two bits of Y' are equal to "10". If so, the process proceeds to step 165 where the value Y'' is XORed with the constant $C_2$ to produce the output data value Y.

If at step 160 it is determined that the two most significant bits of Y' are not equal to "10", it is then determined at step 170 whether the two most significant bits of Y' are equal to "11". If so, this means that the left-shift performed at step 150 will have shifted out both of these logic one values, and accordingly the process proceeds to step 175 where the value Y'' is XORed with the constant $C_1$ and the constant $C_2$ in order to produce the output data value Y.

Finally, if at step 170 it is determined that the most significant two bits of Y' are not equal to "11", then this means that both of those two most significant bits are at a logic zero value, and accordingly the process merely proceeds to step 130, where no reduction is performed and the output data value Y is set equal to the value Y''.

If at step 135 it is determined that the three most significant bits of the input data value X are not equal to "001", then it is determined that no modification of the input data value is required, and accordingly the process proceeds to step 180 where the intermediate input data value X' is set equal to X. Then, at step 185, the lookup table is used to produce the output value Y' using the provided value X', whereafter at step 190 the value Y'' is set equal to Y'. Thereafter, the process proceeds to step 130, where the output data value Y is set equal to Y''.

If instead of the approach of FIG. 1, the simplified approach of FIG. 2 is used where the control block only looks for the situation where the most significant two bits of the input data value X are equal to "01", then it will be appreciated that steps 135, 140, 145, 150, 155, 160, 165, 170 and 175 of FIG. 4 can be omitted.

The values of the constants $C_1$ and $C_2$ will vary dependent on implementation. However, where the multiplicative inverse encoded by the lookup table is being used as part of the S-box or inverse S-box functions of the AES cryptography Standard, then the constant $C_1$ will be set equal to "00011011" and the constant $C_2$ will be set equal to "00110110", both assuming that the input data value X and the output data value Y are 8 bits in length.

Figure 5:
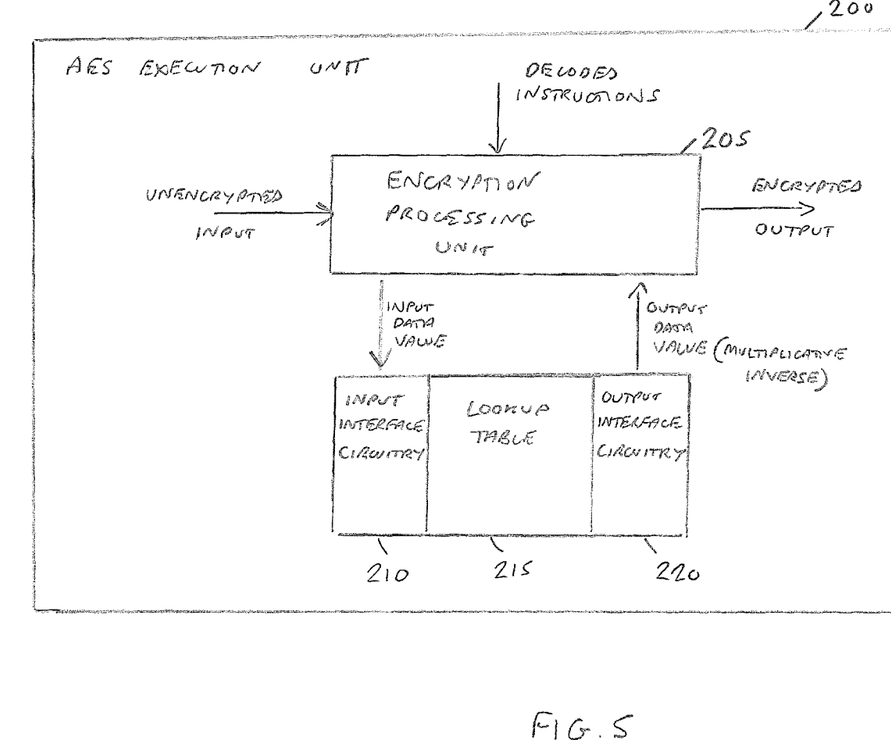
FIG. 5 is a block diagram of an AES execution unit incorporating the lookup table circuitry of the above described embodiments.

FIG. 5 is a block diagram illustrating an AES execution unit 200 incorporating the lookup table circuitry of the earlier described embodiments. Accordingly, an encryption processing unit 205 is arranged to execute a series of decoded instructions in order to encrypt unencrypted input data in order to produce encrypted output data. During execution of these decoded instructions, it will be necessary to evaluate the multiplicative inverse of various data values, and accordingly at that point the required data values will be provided to the input interface circuitry 210 of the lookup table circuitry (implemented by components 10, 15 of the earlier described FIGS. 1 and 2). For each input data value X, the input interface circuitry 210 will then generate the intermediate input data value X' and provide that value X' to the lookup table 215, which will result in the intermediate output data value Y' being provided to the output interface 220 (implemented using the components 35, 50, 55 of the earlier described FIGS. 1 and 2). The output interface circuitry 220 will internally produce the intermediate value Y'' and thereafter the output data value Y to be returned to the encryption processing unit 205.

Whilst in FIG. 5 it is assumed that the encryption processing unit 205 is performing an encryption process to generate encrypted output data from unencrypted input data, the processing unit 205 could alternatively be used to decrypt encrypted input data in order to produce unencrypted output data, again this process requiring a calculation of multiplicative inverse values for various input data values forwarded to the lookup table circuitry.

Figure 6:
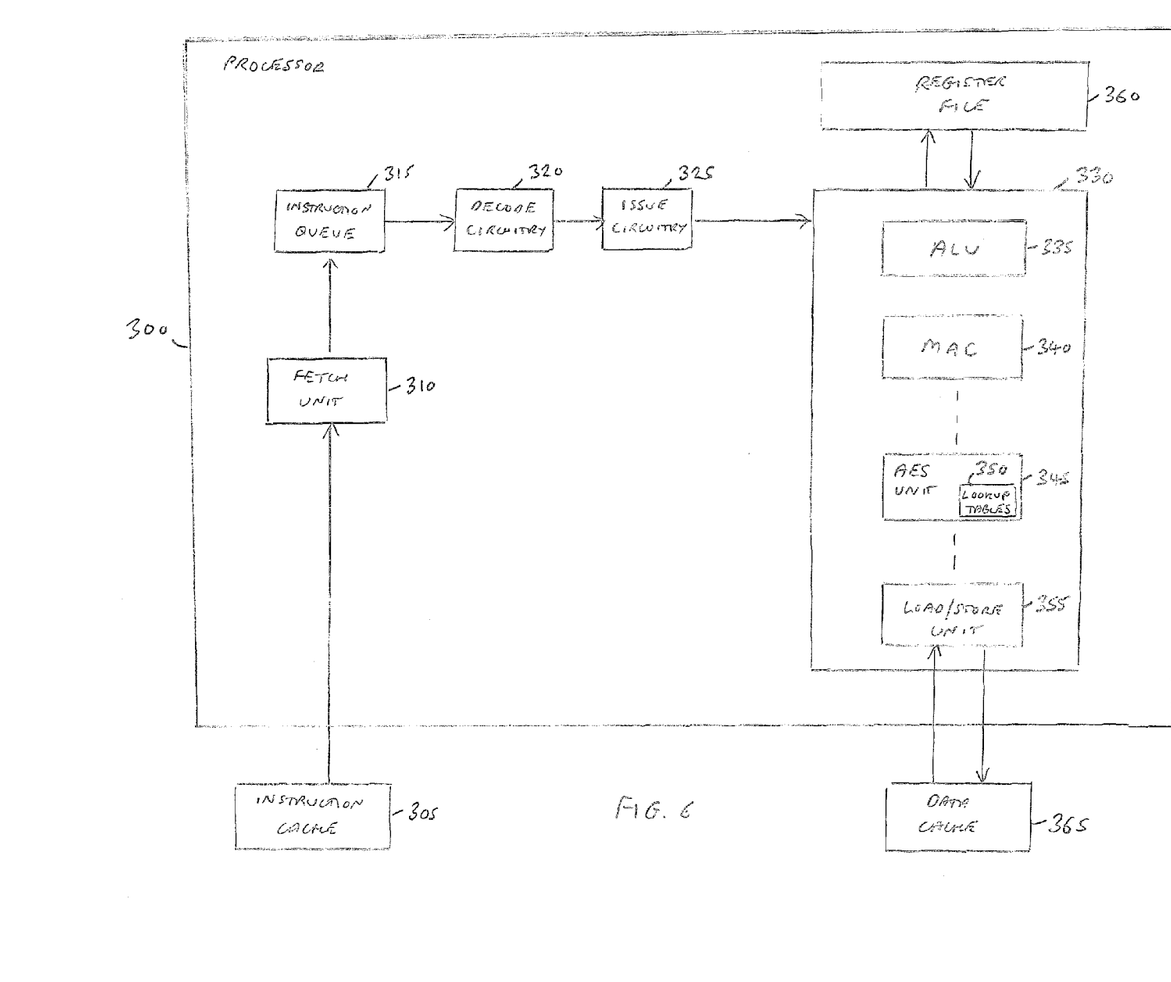
FIG. 6 is a block diagram illustrating a processor and associated instruction and data caches, the processor incorporating an AES execution unit of the form shown in FIG. 5.

FIG. 6 is a block diagram illustrating a processor 300 and its associated instruction cache 305 and data cache 365, the processor including, as one of its execution units 330, an AES execution unit 345. The AES execution unit 345 can take the form illustrated in FIG. 5, and will accordingly include lookup tables 350 conforming to the earlier described embodiments.

In operation, the fetch unit 310 within the processor 300 fetches instructions from the instruction cache 305, which are then placed within an instruction queue 315. From here, the instructions are provided to decode circuitry 320, which decodes the instructions and routes them to issue circuitry 325, from where they are dispatched to the appropriate execution unit within the group of execution units 330 provided by the processor 300. Some examples of execution units are illustrated in FIG. 6, but are not intended to provide an exhaustive list. Hence, an arithmetic logic unit (ALU) 335 may be used to perform arithmetic operations, a multiply-accumulate (MAC) unit 340 may be used to perform multiply-accumulate operations, the AES unit 345 may be used to perform AES encryption and decryption operations, and the load/store unit 355 may be used to load data from the data cache 365 into registers of the register file 360, or to store data from registers of the register file 360 to the data cache 365. As will be understood by those skilled in the art, each execution unit 335, 340, 345, 355 is able during performance of its associated operations to access data from the register file 360 as required in order to perform those operations.

From the above described embodiments, it will be seen that such an approach enables a significant reduction in the size of the lookup table. This in turn results in a significant reduction in the size of the AES execution unit 200 required to perform AES encryption and decryption, and in addition the reduced size lookup table reduces power consumption.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, comprising:
   processing circuitry configured to perform operations on data; and
   lookup table circuitry configured to receive from the processing circuitry an n-bit input data value, and to return to the processing circuitry an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the lookup table circuitry comprising:
      a lookup table including a plurality of entries, each entry identifying a possible input data value and a corresponding output data value, said plurality of entries being less than $2^n$;
      input interface circuitry configured to receive the n-bit input data value and to generate an intermediate input data value for provision to the lookup table, the input interface circuitry being configured to detect a modification condition if any of a predetermined number of significant bits of the input data value are logic zero values, the input interface circuitry being configured, if said modification condition is not detected, to retain the input data value as the intermediate input data value, and being configured, if said modification condition is detected, to perform a shift operation on the input data value in order to generate said intermediate input data value;
      output interface circuitry configured to receive from the lookup table an intermediate output data value corresponding to the intermediate input data value generated by the input interface circuitry, and to generate, from the intermediate output data value, the output data value to be returned to the processing circuitry;
      the output interface circuitry being configured, if said modification condition is not detected by the input interface circuitry, to retain the intermediate output data value as said output data value, and being configured, if said modification condition is detected by the input interface circuitry, to perform an output data value derivation operation on the intermediate output data value in order to generate said output data value, the output data value derivation operation at least taking account of the shift operation performed by the input interface circuitry.

2. A data processing apparatus as claimed in claim 1, wherein said predetermined operation is a multiplicative inverse operation.

3. A data processing apparatus as claimed in claim 2, wherein the processing circuitry is configured to implement one of an AES encryption process and an AES decryption process.

4. A data processing apparatus as claimed in claim 1, wherein the input interface circuitry is configured to detect said modification condition if any of a predetermined number of most significant bits of the input data value are logic zero values, and the shift operation is a left shift operation.

5. A data processing apparatus as claimed in claim 1, wherein said output data value derivation operation comprises a shift of the intermediate output data value by the same number of bits as the associated input data value was shifted by said shift operation in order to produce a modified intermediate output data value, and then an adjustment operation on the modified intermediate output data value if a logic 1 value was present in a predetermined number of significant bits of the intermediate output data value.

6. A data processing apparatus as claimed in claim 5, wherein said adjustment operation comprises addition of at least one predetermined constant to said modified intermediate output data value.

7. A data processing apparatus as claimed in claim 6, wherein said predetermined operation is a finite field arithmetic operation, and said adjustment operation includes an exclusive OR operation.

8. A data processing apparatus as claimed in claim 1, wherein the input interface circuitry is configured to detect said modification condition if any of said predetermined number of most significant bits of the input data value are logic zero values, and the immediately following most significant bit is a logic one value.

9. A data processing apparatus as claimed in claim 8, wherein the input interface circuitry is configured to detect said modification condition if the most significant two bits of the input data value are "01".

10. A data processing apparatus as claimed in claim 9, wherein said lookup table includes $\frac{3}{4} \times 2^n$ entries.

11. A data processing apparatus as claimed in claim 9, wherein said shift operation is a one-bit left shift operation.

12. A data processing apparatus as claimed in claim 11, wherein said output data value derivation operation comprises a one-bit left shift on the intermediate output data value in order to produce a modified intermediate output data value, and then addition of a predetermined constant to the modified intermediate output data value if the most significant bit of the intermediate output data value was a logic 1 value.

13. A method of configuring lookup table circuitry to receive from processing circuitry an n-bit input data value, and to return to the processing circuitry an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the method comprising:
   providing a lookup table having a plurality of entries, each entry identifying a possible input data value and a corresponding output data value, said plurality of entries being less than $2^n$;
   generating, from the n-bit input data value, an intermediate input data value for provision to the lookup table, by:
      (i) detecting a modification condition if any of a predetermined number of significant bits of the input data value are logic zero values;
      (ii) if said modification condition is not detected, retaining the input data value as the intermediate input data value; and
      (iii) if said modification condition is detected, performing a shift operation on the input data value in order to generate said intermediate input data value;
   receiving from the lookup table an intermediate output data value corresponding to the generated intermediate input data value;
   generating, from the intermediate output data value, the output data value to be returned to the processing circuitry by:

(a) if said modification condition is not detected in said step (i), retaining the intermediate output data value as said output data value;

(b) if said modification condition is detected in said step (i), performing an output data value derivation operation on the intermediate output data value in order to generate said output data value, the output data value derivation operation at least taking account of the shift operation performed in said step (iii).

14. A data processing apparatus, comprising:

processing means for performing operations on data; and lookup means for receiving from the processing means an n-bit input data value, and for returning to the processing means an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the lookup means comprising:

lookup table means for providing a plurality of entry means, each entry means for identifying a possible input data value and a corresponding output data value, said plurality of entry means being less than $2^n$;

input interface means for receiving the n-bit input data value and for generating an intermediate input data value for provision to the lookup table means, the input interface means for detecting a modification condition if any of a predetermined number of significant bits of the input data value are logic zero values, the input interface means, if said modification condition is not detected, for retaining the input data value as the intermediate input data value, and, if said modification condition is detected, for performing a shift operation on the input data value in order to generate said intermediate input data value;

output interface means for receiving from the lookup table means an intermediate output data value corresponding to the intermediate input data value generated by the input interface means, and for generating, from the intermediate output data value, the output data value to be returned to the processing means;

the output interface means, if said modification condition is not detected by the input interface means, for retaining the intermediate output data value as said output data value, and, if said modification condition is detected by the input interface means, for performing an output data value derivation operation on the intermediate output data value in order to generate said output data value, the output data value derivation operation at least taking account of the shift operation performed by the input interface means.

15. Lookup table circuitry for use by processing circuitry performing operations on data, the lookup table circuitry being configured to receive from the processing circuitry an n-bit input data value, and to return to the processing circuitry an output data value that would be obtained by performance of a predetermined operation on said input data value, the predetermined operation having a first property that the output data value is a function of the input data value, and a second property that a first output data value produced for a first input data value is derivable from a second output data value produced for a second input data value, the lookup table circuitry comprising:

a lookup table including a plurality of entries, each entry identifying a possible input data value and a corresponding output data value, said plurality of entries being less than $2^n$;

input interface circuitry configured to receive the n-bit input data value and to generate an intermediate input data value for provision to the lookup table, the input interface circuitry being configured to detect a modification condition if any of a predetermined number of significant bits of the input data value are logic zero values, the input interface circuitry being configured, if said modification condition is not detected, to retain the input data value as the intermediate input data value, and being configured, if said modification condition is detected, to perform a shift operation on the input data value in order to generate said intermediate input data value;

output interface circuitry configured to receive from the lookup table an intermediate output data value corresponding to the intermediate input data value generated by the input interface circuitry, and to generate, from the intermediate output data value, the output data value to be returned to the processing circuitry;

the output interface circuitry being configured, if said modification condition is not detected by the input interface circuitry, to retain the intermediate output data value as said output data value, and being configured, if said modification condition is detected by the input interface circuitry, to perform an output data value derivation operation on the intermediate output data value in order to generate said output data value, the output data value derivation operation at least taking account of the shift operation performed by the input interface circuitry.

* * * * *